United States Patent [19]

Mater, Jr.

[11] Patent Number: 5,123,468
[45] Date of Patent: Jun. 23, 1992

[54] COVER FOR VEHICLE WINDOW

[75] Inventor: Robert F. Mater, Jr., Lexington, Ky.

[73] Assignee: Ultraviolet, Ltd., Lexington, Ky.

[21] Appl. No.: 702,288

[22] Filed: May 20, 1991

[51] Int. Cl.⁵ .................................................. B60J 1/20
[52] U.S. Cl. ................................. 150/168; 160/370.2; 296/95.1
[58] Field of Search ..................... 150/166, 167, 168; 160/370.2; 296/95.1, 136

[56] References Cited

U.S. PATENT DOCUMENTS

| | | | |
|---|---|---|---|
| 2,624,406 | 1/1953 | Szychowski et al. | 160/370.2 |
| 3,042,111 | 7/1962 | Wytovich | 150/168 |
| 3,923,339 | 12/1975 | McDonald | 160/370.2 |
| 4,597,608 | 7/1986 | Duffy | 296/95.1 |
| 4,635,993 | 1/1987 | Hooper et al. | 150/168 |
| 4,726,406 | 2/1988 | Weatherspoon | 150/168 |
| 4,903,748 | 2/1990 | Foraker | 160/370.2 |
| 4,966,405 | 10/1990 | Tremaine et al. | 160/370.2 |

FOREIGN PATENT DOCUMENTS

| | | | |
|---|---|---|---|
| 525202 | 5/1956 | Canada | 160/370.2 |
| 674216 | 11/1963 | Canada | 150/168 |
| 1559176 | 1/1980 | United Kingdom | 150/166 |
| 2184701 | 7/1987 | United Kingdom | 296/95.1 |

Primary Examiner—Gary E. Elkins
Attorney, Agent, or Firm—King & Schickli

[57] ABSTRACT

A removable cover for mounting over the exterior of a vehicle window is provided. The cover is formed from a flexible sheet material having a central portion sized and shaped to substantially cover the window and at least two, integral clamping portions at opposite ends of the central portion. The clamping portions are disposed for capture between a door and door frame of the vehicle. The cover also includes a cut-out hand hold in each clamping portion. A handle grip body is mounted to each clamping portion. Each handle grip body includes a face of sufficiently large dimension to engage the door and door frame so as not to pull through between them when the door is closed. In the portions of the sheet material that transition between the central portion and the clamping portions there are provided windows, for visualizing the door frame, and rubber spacers. The windows aid in properly placing the cover on the vehicle windows while the rubber spacers prevent the sheet material from rubbing on the door frame as the clamping portions are positioned between the doors and door frames.

10 Claims, 1 Drawing Sheet

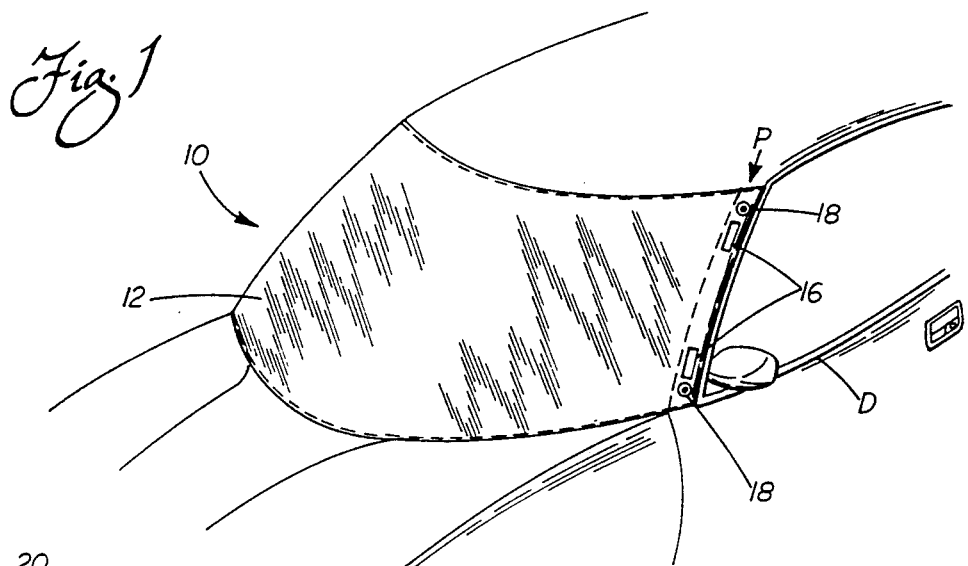
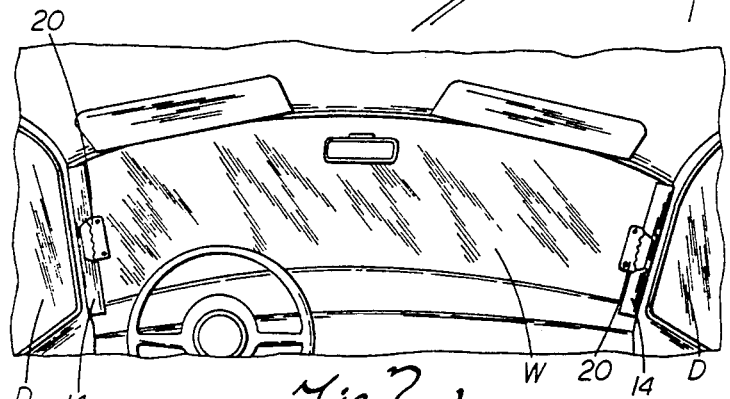
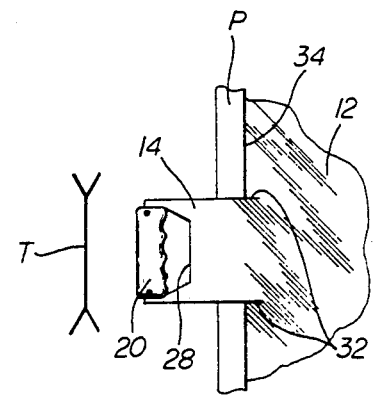
ALTERNATE EMBODIMENT
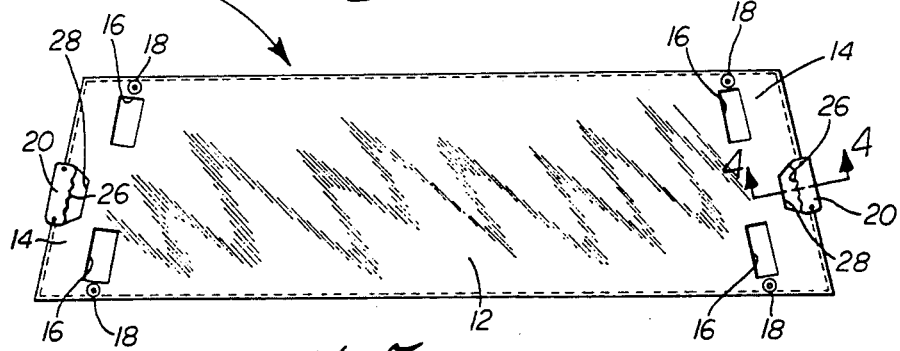
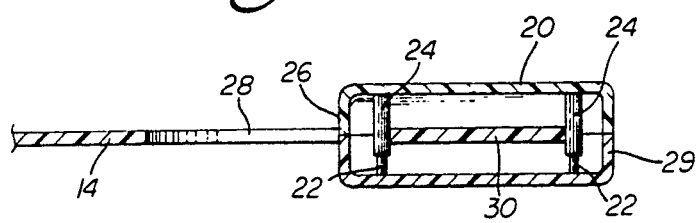

COVER FOR VEHICLE WINDOW

BACKGROUND OF THE INVENTION

The present invention relates generally to vehicle accessories and more particularly, to a flexible cover or shield adapted for placement over the exterior surface of a vehicle window, such as the windshield. The cover protects the windshield from various environmental factors including the buildup of frost, snow, ice and dirt. The cover is also adapted to reflect sunlight thereby substantially preventing the penetration of ultraviolet light and the buildup of heat in the interior of the vehicle.

DESCRIPTION OF RELATED PRIOR ART

It has long been known to utilize covers for vehicles to protect the vehicles from various environmental factors including rain, frost, snow, ice, dirt and sunlight. Examples of such devices particularly adapted for application to the windshield of a vehicle include, for example, U.S. Pat. Nos. 2,599,066 to Osborne; 2,646,118 to Berty; 4,635,993 to Hooper et al.; and 4,790,591 to Miller.

Of these windshield covers or screens, the ones disclosed in the Osborne, Berty and Hooper et al. patents cover the exterior surface of the windshield. Accordingly, these covers are particularly effective in preventing frost, snow and ice from building up on the windshield in the winter. They are also effective in blocking sunlight and at least a portion of the ultraviolet radiation associated therewith from penetrating the interior of the vehicle. As such, in the summer months these covers function to lower heat buildup within the interior of the vehicle. They also reduce damage to interior vehicle components due to extended application of ultraviolet radiation over time.

The covers are also equipped with various mechanisms to prevent theft. For example, the Hooper et al. device incorporates a beaded end flap. More particularly, with the vehicle door open, the end flap is folded around the door frame. The door of the vehicle is then closed so that the beaded end of the flap is held in the interior of the vehicle. Advantageously, since the beaded end is of sufficient dimension so as to engage the door and door frame rather than pull through between them, the cover cannot be stolen from a locked vehicle unless the end flap is cut or the vehicle door is opened such as by jimmying.

While numerous windshield screens or covers of varying design are available in the marketplace, a need for improvements still exists. More specifically, many are inconvenient to utilize. For example, many are difficult to properly position on the window and are difficult to properly hold in position on the window while being secured to the vehicle to prevent theft. Additionally, many of the covers of the type disclosed in Hooper et al. including end flaps that are folded around the door frame and closed within the vehicle door tend to damage paint in the area of the door frame over time. This results from the rubbing action of the flexible material of the cover which can effectively buff the paint from the underlying metal. A need is therefore identified for a vehicle windshield screen or cover of improved design addressing these problems.

SUMMARY OF THE INVENTION

Accordingly, a primary object of the present invention is to provide a vehicle window cover overcoming the above-described limitations and disadvantages of the prior art.

Another object of the present invention is to provide a vehicle window cover made from lightweight, durable material for user convenience and long service life. Preferably, the face of the cover may be printed with an aesthetically pleasing pattern and/or promotional graphics.

Yet another object of the present invention is to provide a vehicle window screen constructed of flexible material that substantially prevents ultraviolet radiation of the sun from entering through the covered windshield and degrading the components of the vehicle interior including, for example, the plastic dashboard.

Still another object of the present invention is to provide a vehicle window cover including handles of molded plastic for ease in handling the vehicle cover when carrying and for ease in manipulation of the vehicle cover when positioning over the window. Advantageously, the handles are also formed with a cross section of sufficient dimension so as to prevent pulling through the space between the door and door frame when the door of the vehicle is closed. When the door is locked this serves to discourage theft of the window cover.

As a further object of the present invention the vehicle window cover incorporates viewing windows to further aid an individual in positioning the cover in proper alignment over the window when in use.

As an additional object, the apparatus also incorporates spacers in the form of rubber grommets that may be utilized to hold the cover in place while closing the vehicle doors over the ends that secure the cover in position. Advantageously, the grommets prevent the cover from pulling across the door frame and buffing or rubbing off the vehicle paint over time.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved apparatus is provided for covering or screening the window of a vehicle from various environmental factors. More particularly, the removable vehicle window cover of the present invention is adapted for mounting on the exterior of a vehicle window. The removable cover comprises a flexible sheet material having a central portion that is sized and shaped to substantially cover the window and at least two clamping portions at opposite ends of the central portion. Each of the clamping portions is disposed for capture between a door and door frame of the vehicle. When so captured, the removable cover is held in position over the window.

To aid in manipulation of the vehicle cover, handles are provided on each clamping portion. Each handle includes an integral stop for engaging the door and door frame when the associated clamping portion is disposed therebetween. This serves to prevent unauthorized removal of the cover from the window of the vehicle.

More particularly, each handle is provided in the form of a grip body. Each grip body includes a pair of interconnected body halves. The handles are mounted at each end of the removable cover. More particularly, the body halves include cooperating pins and mounting sockets that are interconnected with a portion of the flexible sheet material of the clamping portion disposed and held therebetween.

Preferably, each handle is mounted adjacent a handhold cut in the flexible sheet material. A first pair of pins and sockets are provided at one side of the handle and extended through the handhold. A second pair of pins and cooperating sockets are mounted at the other side of the handle and are interconnected just beyond the outer periphery of the end edge of the flexible material.

Advantageously, at least one face of each handle has a dimension sufficiently large so as to engage the door and door frame and not pull through between them when the door is closed and the clamping portion extends therebetween. Thus, by locking the vehicle door it is possible to secure the window cover to the vehicle and thereby prevent theft absent the thief breaking into the vehicle. While it should also be realized that the thief could cut the cover adjacent the point where it is received and extends through the space between the door and door frame, this essentially renders the device useless. Accordingly, theft is effectively prevented.

In accordance with yet another aspect of the present invention, the removable cover also includes viewing windows provided in the two portions of the sheet material that transition between the central body and each of the clamping portions. In positioning the cover on the window of the vehicle, the viewing windows are positioned over the upright or door frame pillar at the end of the windshield. Since the cover is customized to the vehicle and windshield on which it is being placed, this convenient means of positioning insures that the cover is properly positioned on the window before either of the clamping portions is captured between the door and door frame.

The removable cover also includes a spacer element, in the form of at least one and preferably two rubber grommets that are also provided in the portions of the sheet material that transition between the central body and each of the clamping portions. Accordingly, it should be appreciated that the rubber grommets are positioned in engagement with the door frame pillar when the cover is properly positioned and seated on the window. Advantageously, the rubber grommets serve to space the sheet material from the door frame pillar and prevent it from rubbing on the pillar as the clamping portions are positioned between the doors and door frames. Additionally, the rubber grommets provide a convenient means of identifying the position to hold the cover down against the vehicle as the individual doors are closed to clamp the clamping portions in position.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention, and together with the description serves to explain the principles of the invention. In the drawing:

FIG. 1 is a fragmentary perspective view of the removable cover of the present invention positioned on the exterior surface of a window of a vehicle;

FIG. 2 is a fragmentary interior view showing the removable cover and vehicle of FIG. 1 including the clamping portions and handles held in the interior of the vehicle by means of the closed doors against the door frames;

FIG. 3 is a front elevational view of the removable window cover;

FIG. 4 is a cross-sectional view along line 4—4 of FIG. 3 showing the connection of the body halves of one handle to the flexible sheet material; and FIG. 5 is a fragmentary front elevational view showing an alternative embodiment of the invention including a clamping portion of reduced transverse dimension and overcut notches at each side where joining to the central portion of the sheet material.

Reference will now be made in detail to the present preferred embodiment of the invention, an example of which is illustrated in the accompanying drawing.

DETAILED DESCRIPTION OF THE INVENTION

Reference is now made to the drawing figures showing the improved removable cover 10 of the present invention for covering the exterior surface of a vehicle window such as a windshield W. The cover 10 is formed from a flexible sheet material such as a metalized film laminated to polyethylene or plastic film (e.g. Mylar). More particularly, the cover 10 is cut so as to be sized and shaped to cover a particular window of a vehicle upon which the cover is to be utilized. Advantageously, the Mylar sheet material is strong and durable so as to provide a long service life. It also is adapted to reflect ultraviolet light thereby reducing the amount of ultraviolet light that reaches the dashboard and other interior components through the covered window. Accordingly, degradation of these components over time as a result of ultraviolet light exposure is significantly reduced.

As best shown in FIG. 3, this sheet material has a central portion 12 and two integral clamping portions 14. One clamping portion 14 is provided at each end of the central portion 12. A pair of viewing windows 16, such as cut outs, are provided in the sheet material in the area of the transitions between the central portion 12 and each clamping portion 14. As described in greater detail below, and shown in FIGS. 1 and 2, the viewing windows 16 aid in properly positioning the screen 10 on the vehicle window to be covered.

One or more spacers 18, such as the rubber or vinyl grommets shown in the drawing figures, are also positioned in each portion of the sheet material that transitions between the central portion 12 and clamping portions 14. When the cover 10 is properly positioned over the windshield, the rubber grommets 18 engage the door frame pillar P that extends between the windshield and the door D. Advantageously, the grommets 18 serve to space the Mylar sheet material of the cover 10 from the metal door frame pillars P thereby preventing the sheet material from rubbing over/across and buffing paint from the pillar during placement or as a result of buffeting by high winds.

A handle 20 is mounted to each clamping portion 14. Each handle 20 is formed from a pair of handle grip bodies molded, for example of ABS plastic. As shown in FIG. 4, the two handle grip body halves are connected together by pins 22 on one body half that are received in cooperating sockets 24 on the other body half. As shown, the pins 22 and sockets 24 adjacent the front face 26 of the handle 20 are received through a cut-out hand hold 28. This hand hold 28 is cut in the sheet material forming each clamping portion 14. The pins 22 and sockets 24 adjacent the rear face 29 of the handle 20 are interconnected just beyond the outer end edge of the sheet material. Thus, an integral strip 30 of sheet material is captured in the handle 20, disposed between the handle halves. The handles 20 are thereby secured in position.

An alternative embodiment is shown in FIG. 5. In this embodiment the clamping portion 14 has a significantly reduced transverse dimension T relative to the central portion 12. Overcut notches 32 are also provided at each side of the clamping portion 14 where the clamping portion joins the central portion 12. This embodiment is particularly adapted for use on vehicles with high pillars P or rain gutters. More particularly, the overcut notches 32 allow the end edge 34 of the central portion 12 to lie under the edge of the pillar P for a closer fit to the window W while the clamping portion 14 is still able to wrap over and around the pillar for clamping in the door as described below in detail.

Advantageously, the cover 10 of the present invention is very easy to utilize. First, the cover 10 is removed from its convenient storage location such as the trunk, glovebox or under a seat of the vehicle. The cover 10 is then unfolded or unrolled and spread across the windshield W. With one of the vehicle's front doors open, the individual then positions the viewing windows 16 and grommets 18 at one side of the cover 10 directly over the door frame pillar P between the windshield W and the door D. The clamping portion 14 on that same side is then folded around the door frame pillar P. Next, the individual presses his or her thumbs down on the grommets 18 so as to hold the cover 10 in position while maintaining the other fingers clear of the door as the door is closed with a push from the torso or legs.

The same procedure is then followed on the other side of the vehicle to secure the other clamping portion 14. Once completed, both clamping portions 14 are held between the front doors D and door frames of the vehicle. Additionally, the central portion 12 is held over the exterior of the windshield W. As the central portion 12 is custom cut to the size and shape of the vehicle windshield, the windshield W is fully covered. As such, frost, snow, ice, dust and other environmental factors are prevented from contacting and building up on the windshield W. Additionally, heat and ultraviolet light are reflected away from the interior of the vehicle. Advantageously, the resulting lower interior temperatures and lower ultraviolet light levels significantly reduce the fatigue of interior components over time. For example, cracking and blistering of dashboard materials and any fading of the color of interior components from "sun bleaching" are significantly reduced or even eliminated.

By locking all the vehicle doors, it should also be appreciated that theft of the cover 10 is essentially prohibited. More particularly, the front face 26 of the handles 20 are of significantly large dimension to engage the door D and door frame of the vehicle thereby preventing the clamping portion 14 at either end from pulling through between the door and door frame and out of the vehicle interior.

When the vehicle operator returns to the vehicle, the screen may be easily removed by simply opening both doors D and folding or rolling the cover 10 up for convenient storage. At all times, the handles 20 allow the cover 10 to be quickly and conveniently manipulated. Additionally, the durable Mylar material is light in weight so that the cover 10 may be utilized with little physical effort.

In summary, numerous benefits result from employing the concepts of the present invention. Advantageously, the cover 10 is provided with handles 20 for ease in handling when carrying as well as for ease in manipulation when positioning over the vehicle windshield. The handles 20 are also advantageously formed with a cross section of sufficient dimension so as to prevent them pulling through the space between the door and door frame when the door of the vehicle is closed. Hence, when the doors are locked this serves to discourage theft of the window cover 10. Additionally, the cover 10 includes viewing windows 16 and spacers 18 in the form of rubber grommets that serve to aid in the positioning of the cover in proper alignment over the window when in use.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A removable cover adapted for mounting on the exterior of a vehicle window, comprising:

a flexible sheet material having a central position sized and shaped to substantially cover the window and at least two clamping portions at opposite ends of said central position, each of said clamping portions being disposed for capture between a door and door frame of said vehicle for holding said cover in position;

handle means for manipulating said cover on each of said clamping portions, each of said handle means including a cut out hand hold in said sheet material forming said clamping portion and each of said handle means being separately formed and further including a handle grip body attached to said clamping portion; and stop means on said handle means for engaging said door and door frame when said clamping portions are disposed therebetween so as to prevent unauthorized removal of said cover.

2. The removable cover set forth in claim 1, wherein said stop means is a face of said handle grip body having a dimension sufficiently large so as to engage said door and door frame and not pull-through between them.

3. The removable cover set forth in claim 1, wherein said handle grip body includes a pair of interconnected body halves having a section of said sheet material of said clamping portion captured therebetween.

4. The removable cover set forth in claim 1, further including viewing means provided in portions of said sheet material that transition between said central body and each of said clamping portions, said viewing means being positioned over said door frame when said cover is properly positioned on said window.

5. The removable cover set forth in claim 1, further including spacer means for holding said cover in place and preventing said cover from pulling across the door frame of the vehicle, said spacer means being provided in portions of said sheet material that transition between said central body and each of said clamping portions, said spacer means being positioned in engagement with said door frame when said cover is properly positioned on said window.

6. The removable cover set forth in claim 5, wherein said spacer means are rubber grommets that space said sheet material from said door frame and prevent it from rubbing on said door frame as said clamping portions are positioned between said doors and door frames.

7. The removable cover set forth in claim 1 wherein said clamping portions have a reduced transverse dimension relative to said central portion and overcut notches are formed in said central portion in line with each peripheral side edge of said clamping portions so as to allow said central portion to lie down against the window to be covered while said clamping portions are wrapped around and over said door frame for capture by said doors.

8. A removable cover adapted for mounting on the exterior of a vehicle window, comprising:
a flexible sheet material having a central portion sized and shaped to substantially cover the window and at least two clamping portions at opposite ends of said central portion, each of said clamping portions being disposed for capture between a door and door frame of said vehicle for holding said cover in position;
handle means for manipulating said cover on each of said clamping portions;
viewing means provided on portions of said sheet material that transition between said central body and each of said clamping portions, said viewing means being positioned over said door frame when said cover is properly positioned on said window; and
stop means on said handle means for engaging said door and door frame when said clamping portions are disposed therebetween so as to prevent unauthorized removal of said cover.

9. A removable cover adapted for mounting on the exterior of a vehicle window; comprising:
a flexible sheet material having a central portion sized and shaped to substantially cover the window and at least two clamping portions at opposite ends of said central portion, each of said clamping portions being disposed for capture between a door and door frame of said vehicle for holding said cover in position;
handle means for manipulating said cover on each of said clamping portions;
rubber grommets for holding said cover in place and preventing said cover from pulling across the door frame of the vehicle provided in portions of said sheet material that transition between said central body and each of said clamping portions, said rubber grommets being positioned in engagement with said door frame when said cover is properly positioned on said window; and
stop means on said handle means for engaging said door and door frame when said clamping portions are disposed therebetween so as to prevent unauthorized removal of said cover.

10. A removable cover adapted for mounting on the exterior of a vehicle window by capture between a door and door frame of said vehicle, comprising:
a flexible sheet material having a central portion sized and shaped to substantially cover the window and at least two clamping portions at opposite ends of said central portion, said clamping portions each having a reduced transverse dimension relative to said central portion;
overcut notches formed in said central portion in line with each peripheral side edge of said clamping portions so as to allow said central portion to lie down against the window to be covered while said clamping portions are wrapped around and over said door frame for capture by said doors, each of said clamping portions being disposed for capture between said door and door frame of said vehicle for holding said cover in position;
handle means for manipulating said cover on each of said clamping portions; and
stop means on said handle means for engaging said door and door frame when said clamping portions are disposed therebetween so as to prevent unauthorized removal of said cover.

* * * * *

UNITED STATES PATENT AND TRADEMARK OFFICE
CERTIFICATE OF CORRECTION

PATENT NO.  : 5,123,468
DATED       : June 23, 1992
INVENTOR(S) : Robert F. Mater, Jr.

It is certified that error appears in the above-indentified patent and that said Letters Patent is hereby corrected as shown below:

Claim 1, (Column 6, line 53), change "position" to --portion--; and at (Column 6, line 56), change "position" to --portion--.

Signed and Sealed this

Third Day of August, 1993

Attest:

MICHAEL K. KIRK

Attesting Officer

Acting Commissioner of Patents and Trademarks